(12) United States Patent
Reznik

(10) Patent No.: US 7,123,656 B1
(45) Date of Patent: Oct. 17, 2006

(54) SYSTEMS AND METHODS FOR VIDEO COMPRESSION

(75) Inventor: Yuriy Reznik, Seattle, WA (US)

(73) Assignee: Realnetworks, Inc., Seattle, WA (US)

( * ) Notice: Subject to any disclaimer, the term of this patent is extended or adjusted under 35 U.S.C. 154(b) by 886 days.

(21) Appl. No.: 09/865,037

(22) Filed: Oct. 1, 2001

(51) Int. Cl.
 H04N 7/12   (2006.01)
 H04N 11/02  (2006.01)

(52) U.S. Cl. .............................. 375/240.18; 375/240.2

(58) Field of Classification Search ............................... 375/240.01–240.06, 240.12–240.18, 240.26; 382/246
See application file for complete search history.

(56) References Cited

U.S. PATENT DOCUMENTS

| | | | |
|---|---|---|---|
| 5,786,857 A * | 7/1998 | Yamaguchi | 375/240.03 |
| 6,081,211 A * | 6/2000 | de Queiroz et al. | 341/65 |
| 6,118,890 A * | 9/2000 | Senior | 382/125 |
| 6,249,546 B1 * | 6/2001 | Bist | 375/240.03 |
| 6,347,157 B1 * | 2/2002 | Chui | 382/240 |
| 6,504,872 B1 * | 1/2003 | Fimoff et al. | |
| 6,542,545 B1 * | 4/2003 | Vetro et al. | 375/240.08 |
| 6,597,738 B1 * | 7/2003 | Park et al. | 375/240.16 |
| 6,628,709 B1 * | 9/2003 | Lin et al. | 375/240.03 |
| 6,778,708 B1 * | 8/2004 | Divakaran et al. | 382/236 |

OTHER PUBLICATIONS

Nefian, Ara V; Hayes, Monson H. An Embedded HMM —Based Approach For Face Detection And Recognition; IEEE; 1999.*

* cited by examiner

Primary Examiner—Mehrdad Dastouri
Assistant Examiner—Dave Czekaj
(74) Attorney, Agent, or Firm—Steven Stewart

(57) ABSTRACT

The present invention is directed to systems and methods for video compression. In one embodiment, a method of encoding a matrix of transform coefficients is performed. The method includes receiving a matrix of transform coefficients, creating a probabilistic model representing dependencies and correlations between coefficient locations and groups of coefficients from said matrix, and utilizing the probabilistic model to create an entropy encoding of the matrix. The probabilistic model my be, by way of example, a Markov model.

26 Claims, 13 Drawing Sheets

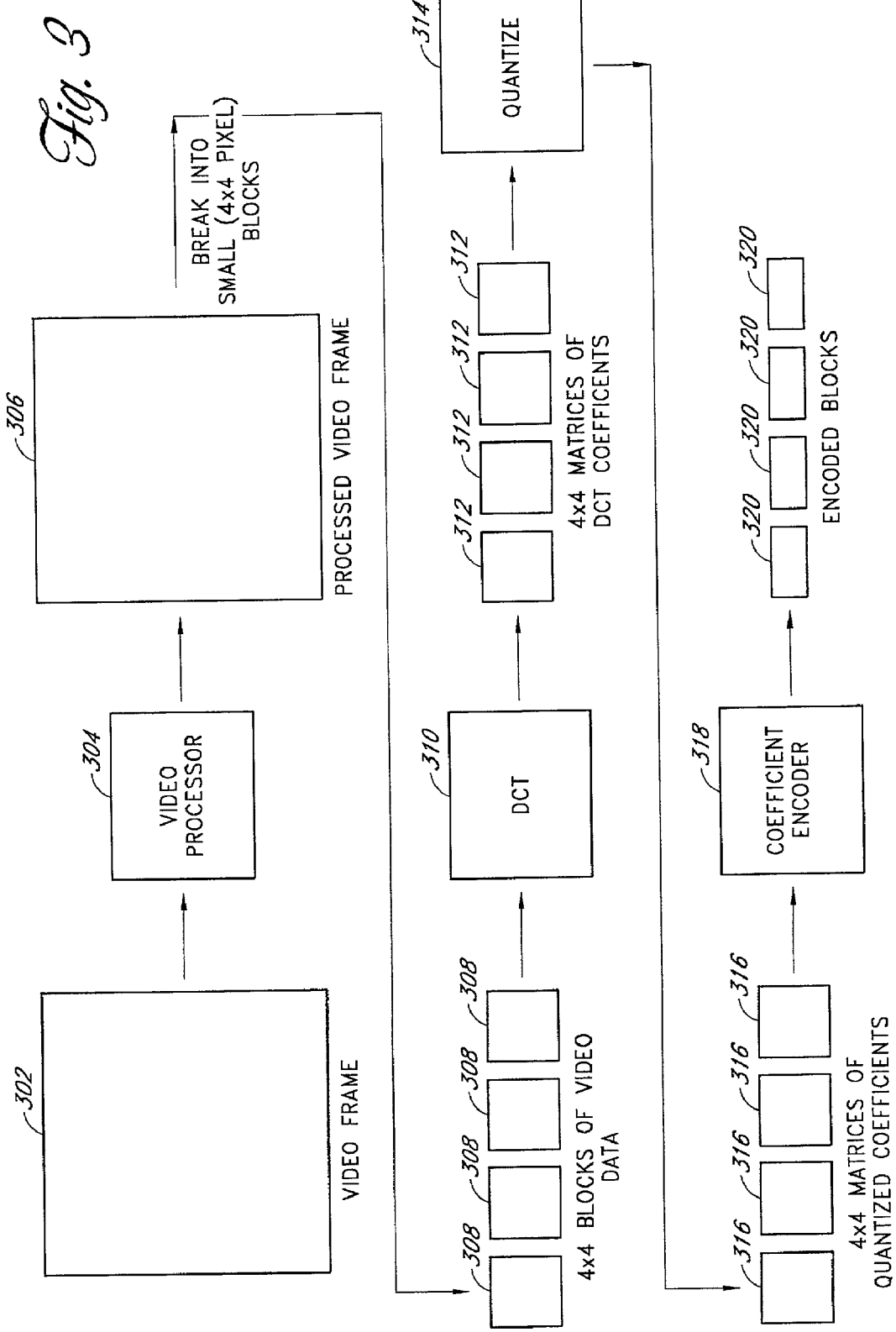

| SYMBOL | PROBABILITY | HUFFMAN CODE |
|--------|-------------|--------------|
| a | .392 | 0 |
| b | .001 | 111111 |
| c | .053 | 11110 |
| d | .201 | 110 |
| e | .125 | 100 |
| f | .020 | 111110 |
| g | .097 | 1110 |
| h | .111 | 101 |

COEFFICIENT LOCATION GROUPING FOR A 2x2 DESCRIPTOR

Fig. 5a

COEFFICIENT LOCATION GROUPING FOR A 4x4 DESCRIPTOR

▨ QUADRANT TL

MARKOV MODEL EXAMPLE FOR
TWO COEFFICIENTS

IDENTIFIERS FOR COEFFICIENT LOCATION (0,0)

| ABSOLUTE VALUE | IDENTIFIER |
|---|---|
| 0 | 0 |
| 1 | 1 |
| 2 | 2 |
| ≥3 | 3 |

*600*

IDENTIFIERS FOR COEFFICIENT LOCATION (0,1), (1,0), AND (1,1)

| ABSOLUTE VALUE | IDENTIFIER |
|---|---|
| 0 | 0 |
| 1 | 1 |
| ≥2 | 2 |

*602*

IDENTIFIERS FOR QUADRANTS TR, BL, AND BR

| ABSOLUTE VALUE | IDENTIFIER |
|---|---|
| 0 | 0 |
| ≥1 | 1 |

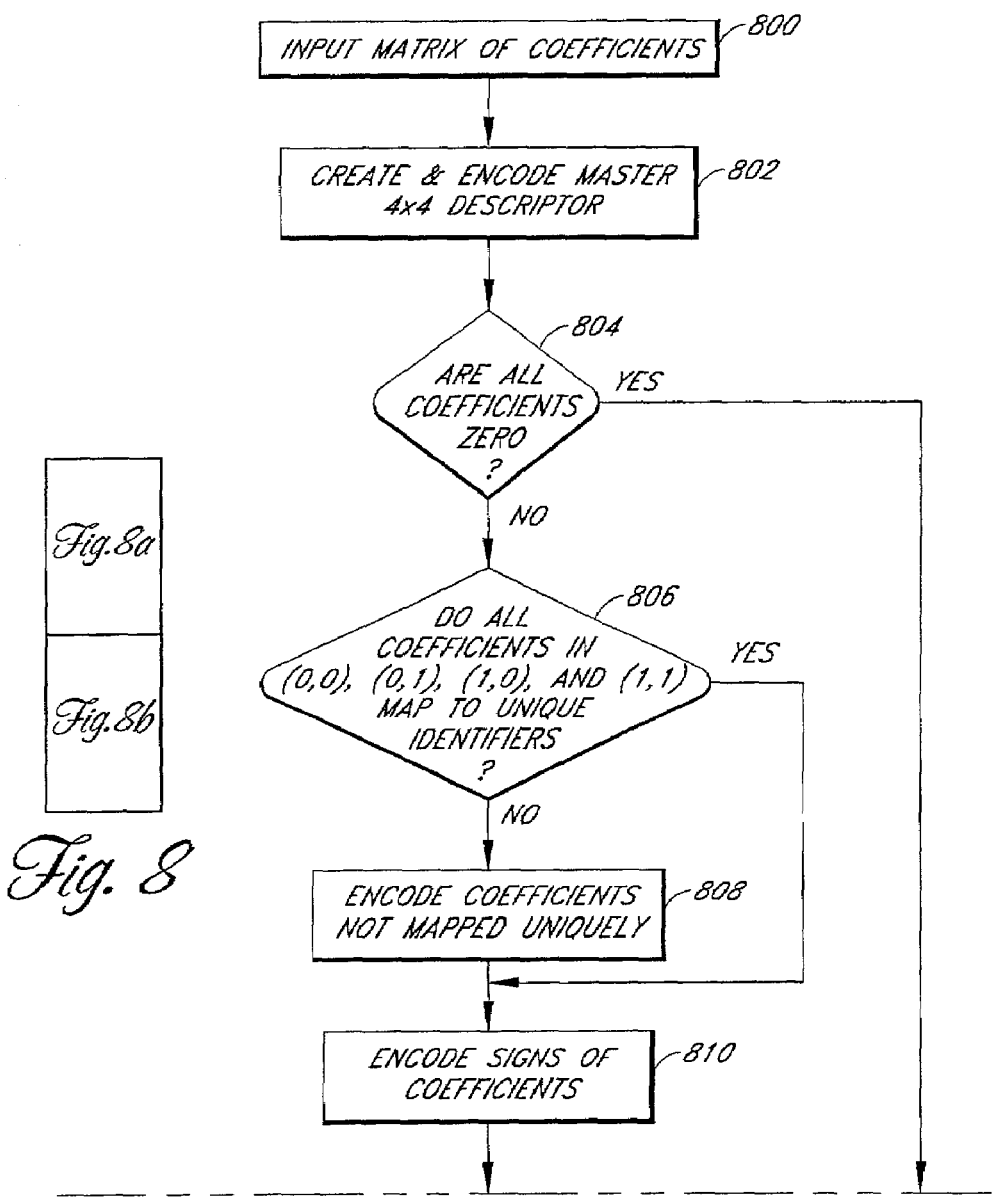

SYSTEMS AND METHODS FOR VIDEO COMPRESSION

BACKGROUND OF THE INVENTION

1. Field of the Invention

The present invention relates to the compression of video data. More specifically, the invention provides a system and method of encoding transformed video data to provide efficient compression.

2. Description of the Related Art

There is an increasing call for digital media representations of video and audio data to be presented on personal computers or other forms of end user terminals. Frequently, due to the size of the representations, digital media representations are stored at a remote location and are accessed remotely by personal computers over a computer network such as the Internet. In addition, much of the media is stored in files so that it can be later transmitted in a streaming format. In order to reduce storage required for large media representations, these media files are typically compressed at the storage location before transmission and then decompressed by the local personal computer so that the file may be presented. By compressing the representation, less storage space is required and the representation is more easily transmitted across networks of limited bandwidth. This efficiency of transmission also allows for smoother and more detailed presentation of real-time video and audio to better satisfy viewers' expectations.

To reduce storage and transmission requirements for digital audio and video, a number of encoding standards have been developed, which are well known in the art. Existing digital video compression encoding standards use a number of common encoding techniques, including transform encoding (one example of which is the discrete cosine transform, or DCT), quantization, and entropy encoding (e.g., Huffman coding, run length coding, and arithmetic coding) among others.

Well known references discussing these techniques include: K. R. Rao and J. J. Hwang, *Techniques & Standards for Image, Video, & Audio Coding*, Prentice Hall 1996; K. R. Rao and R. Yip, *Discrete Cosine Transform: Algorithms, Advantages, Applications*, Academic Press, Inc. 1990; A. Gersho, R. Gray, *Vector Quantization and Signal Compression*, Kluwer Academic Publishers 1992; T. Bell, et. al., *Text Compression*, Prentice Hall 1990.

In encoding digital video, there are limitations on the amount of data that can be efficiently transmitted. Frequently, to transmit as many images as possible within a fixed bandwidth, it is necessary to cut back on the amount of data transmitted for each image. Currently, in many video compression systems, the data is pared down after the images are transformed, but before the final encoding is performed.

In particular, many video encoding systems' embody a "lossy" design where data is lost after the point that the video data has been transformed using DCT. One technique involves taking the matrix of coefficients that results from the DCT and then creating an estimate of the values in that matrix. This estimate is what is then transmitted. The data loss occurs because the estimate will necessarily lose some information when it is created. One version of this estimating procedure involves selectively dropping values that fall below a certain threshold. Another technique involves reading the values of the matrix in a "zig-zag" order that starts at the upper-left hand of the matrix and spreads out from there. This is done to take advantage of the fact that the expected magnitude of the coefficients typically drops exponentially as they are visited by the zig-zag scan. Because it is assumed that the values along the further reaches of the scan will be very close to zero, the scan may be stopped before it visits every coefficient, and only the scanned values are transmitted. To further reduce the size of these image data, the values along the scan may be estimated through the use of an exponential function. This technique requires only the transmission of the parameters of the function itself. This removal of data necessarily involves the loss of some video information. This loss can result in a loss of detail in the presented video, sometimes to the degree that it is noticeable even to the casual viewer.

Another technique used by some video coding systems is the use of probability information to determine the nature of the encoding scheme for the coefficients that are transmitted. A number of entropy encoding systems (including Huffman coding, arithmetic coding, and Shannon-Fano coding) utilize knowledge of the probabilities of each coefficient to create an efficient coding. In essence, the more probable a particular coefficient is, the smaller its encoded form is so that the set of coefficients may be transmitted using as few bits as possible. Some techniques encode based on single coefficients, while others scan as a zig-zag, encoding non-zero coefficients along with the number of zero-value coefficients that immediately follow. It is useful to consider multiple coefficients when computing probabilities, because the nature of DCT creates matrices that sometimes demonstrate correlation between coefficient values. If dependencies between coefficients are considered when encoding, certain combinations can be found to be more probable, enabling greater entropy efficiency. While current techniques do have the benefit of somewhat more efficient encoding of a set of coefficients, they take very limited advantage of the above-mentioned correlations by only considering coefficients that are adjacent on the zig-zag scan, and even then are typically limited to at the most considering dependencies between the values of non-zero coefficients and the numbers of zero coefficients that immediately follow. This does little in the way of exploiting coefficient dependencies.

SUMMARY OF THE INVENTION

The present invention advantageously provides an encoding system that can efficiently encode quantized transformed video in a compact form without unacceptably losing information, so that the video may be efficiently transmitted and presented with greater detail. The present invention provides greater encoding efficiency by analyzing much more complex coefficient dependencies than conventional systems. Thus, one embodiment of the present invention provides transmitted video that is both quantitatively and subjectively similar to the original source, while using less bandwidth than conventional systems.

One embodiment of the present invention is a method of producing an encoded representation of an input media signal based on probabilistic analysis. The method comprises: (1) receiving an input media signal; (2) encoding the media signal to generate an output signal, encoded according to a probabilistic analysis, representing the input signal. One aspect of the present embodiment is one wherein the medial signal comprises a video input sequence, wherein the video input sequence comprises frames of digital video. Another aspect is one wherein the video frames are divided into blocks that are then transformed into matrices of coefficients before encoding. Another aspect of the present embodiment is one wherein coefficients in a matrix are combined into data structures that constitute the output signal. Another aspect of the present embodiment is one wherein the probabilities of these data structures are analyzed to create an optimal encoding scheme. A preferred aspect of the method comprises (1) identifying a frame in the input sequence; (2) dividing the frame into smaller blocks; (3) transforming each block using Discrete Cosine Transform into a matrix of transform coefficients and quantizing these coefficients; (4) encoding each matrix as a set of nested descriptors that recursively describe square blocks of adjacent coefficients; and (4) using the known probabilities of these descriptors to encode them in the output signal.

One embodiment of the present invention is a computer readable medium having stored thereon a plurality of instructions which, when executed by a processor in a computer system, cause the processor to perform a number of actions. The actions comprise: (1) accepting an input video signal; (2) transforming the individual frames of the signal into matrices of discrete cosine transform coefficients; (3) representing the coefficients as sets of descriptors that describe each matrix; and (4) encoding these descriptors according to their probabilities.

One embodiment of the present invention is a system for producing encoded representations of a video input sequence based on probabilistic analysis. The system comprises: (1) a video encoder configured to generate an encoded representation of the video input sequence based on probabilistic analysis, and (2) an output module configured to output the encoded representations. One aspect of the present embodiment is one wherein the probabilistic analysis is performed on adjacent coefficients in a discrete cosine transform matrix of a video block. A preferred aspect of the system is one wherein the encoded representation created is one consisting of multiple descriptors that recursively describe square blocks of adjacent coefficients. Another preferred aspect of the system is one wherein the probabilistic analysis is performed on sets of descriptors. Another preferred aspect is one wherein the probabilistic data are kept in a series of code tables that are created before the encoding and utilized by the encoding to encode the descriptors. An alternative aspect is one wherein the encoding scheme is created as the input sequence is encoded and is updated during the course of the encoding.

One embodiment of the present invention is a method of encoding discrete cosine transform data using probabilistic analysis. The method comprises: (1) providing a matrix of discrete cosine transform data; (2) using the matrix to generate a series of data structures that describe the matrix; and (3) encoding these data structures according to an analysis of their probabilities. One aspect of a preferred embodiment is one wherein the data structures describe square blocks of coefficients from the matrix. Another aspect of the preferred embodiment is one wherein descriptors for small blocks of coefficients are nested within descriptors for larger blocks. Another aspect of the preferred embodiment is one wherein the descriptors recursively describe the entire matrix. Another aspect of the preferred embodiment is one wherein the encoding is performed using a code table created before encoding by a probabilistic analysis of the frequency of the descriptors. An alternate aspect is one wherein the encoding scheme is adapted over the course of the encoding according to probabilistic analysis of the frequency of the descriptors being encoded.

One embodiment of the present invention is a data file containing an encoding of a discrete cosine transform matrix. The data file comprises representations of groups of adjacent matrix coefficients, encoded according to the probabilities of each representation value. One aspect of a preferred environment is one wherein the representations are of descriptors of square blocks of coefficients. Another aspect of a preferred embodiment is one wherein larger descriptors contain smaller descriptors or individual coefficients in a manner that recursively represents a whole block of coefficients.

Still another aspect of the present invention is a method of encoding transformed quantized video data for transmission over a network, comprising: receiving a matrix of transform coefficients; isolating specific coefficient locations and groups of coefficients to be represented in a descriptor; mapping the values of coefficients in said specific locations and said groups to defined identifiers; combining said identifiers to create a first descriptor for the matrix; including information in said first descriptor to explicitly identify the values at said specific coefficient locations; creating descriptors smaller then the first descriptor that contain the explicit values coefficients in said groups of coefficients; creating entropy encoding schemes for said descriptors and said coefficient values; and encoding said descriptors and coefficient values according to said encoding schemes.

Another aspect of the present invention is a method of encoding a matrix of transform coefficients, comprising: receiving a matrix of transform coefficients; creating a probabilistic model representing dependencies and correlations between coefficient locations and groups of coefficients from said matrix; and utilizing the probabilistic model to create an entropy encoding of the matrix.

Yet another aspect of the present invention is a computer readable medium having stored thereon a plurality of instructions which, when executed by a processor in a computer system, cause the processor to perform the process of: accepting a matrix of quantized transform coefficients; creating one or more descriptors that represent said matrix; and encoding said matrix utilizing an entropy encoding scheme created from projected probabilities of the descriptors.

One aspect of the present invention is a video encoding system, comprising: a host computer; a digital video input sequence; an output stream comprising an encoded representation of said video input sequence, wherein said output stream includes entropy encoded representations of transformed video data, and wherein said entropy encoding is based on a probabilistic analysis of said transformed video data; and a video encoding module configured to be executed on said host computer, wherein said video encoding module is configured to encode said video input sequence according to a probabilistic analysis of coefficient matrices created by transforming said video input sequence.

Another aspect of the present invention is a system for encoding a matrix of transform coefficients, comprising: a grouping module configured to accept said matrix and to selectively define a plurality of coefficient locations as belonging to one or more defined groups; and an encoding module that contains at least a first entropy encoding scheme for coefficients and coefficient groups, the encoding module configured to create encoded representations of said matrix, resulting in an entropy encoded matrix, by one of entropy encoding said coefficients and coefficient groups according to said entropy encoding scheme, and entropy encoding representations of those coefficients and coefficient groups.

BRIEF DESCRIPTION OF THE DRAWINGS

Referring now to the drawings in which like reference numbers represent corresponding components throughout:

FIG. 3 illustrates one embodiment of a video encoding process;

FIG. 4d illustrates an example of an entropy encoding;

FIGS. 5a–b illustrate the division of 4×4 and 2×2 squares of coefficients to create descriptors;

FIG. 6 illustrates the mapping of coefficient values into descriptor identifiers;

FIGS. 8a–b, 9 illustrate example embodiments of descriptor creation and encoding processes.

DETAILED DESCRIPTION OF PREFERRED EMBODIMENTS

Figure 1:
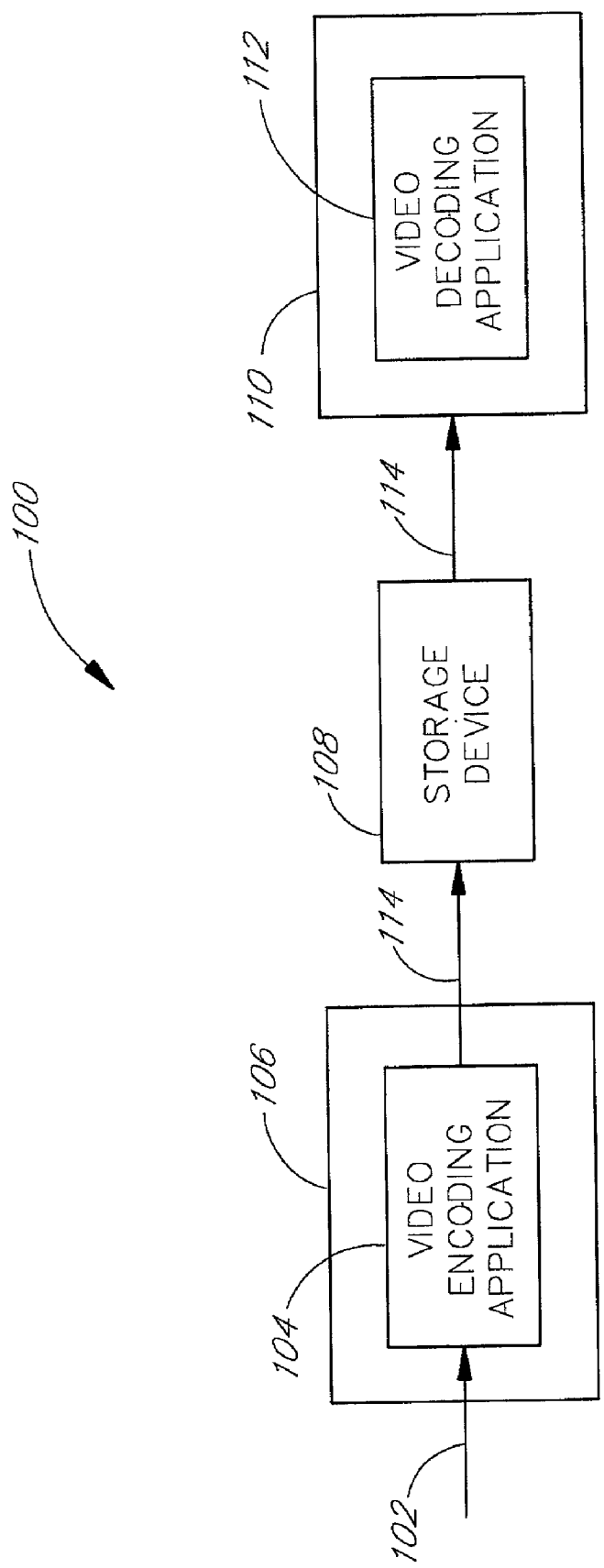
FIG. 1 illustrates one embodiment of a system including a video encoding application in accordance with the present invention.

In the following description, reference is made to the accompanying drawings, which form a part hereof, and which show, by way of illustration, specific embodiments in which the invention may be practiced. It is to be understood that other embodiments may be utilized and structural changes may be made without departing from the scope of the present invention. Where possible, the same reference numbers will be used throughout the drawings to refer to the same of like components. Numerous specific details are set forth in order to provide a thorough understanding of the present invention. However, it will be obvious to one skilled in the art that the preset invention may be practiced without the specific details or with certain alternative equivalent devices and methods to those described herein. In other instances, well-known methods, procedures, components, and devices have not been described in detail so as not to unnecessarily obscure aspects of the present invention.

I. Definition of Terms

Blocks

Groups of video pixels that are the basic units of video to be encoded. For example, a block may be a 4×4 array of video pixels.

Discrete Cosine Transform (DCT)

A method used in digital signal processing to decompose signals into frequency components for easier transmission and manipulation. A discrete cosine transform of a block of video pixels results in a matrix of values known as transform coefficients.

Entropy Encoding

Entropy is a measure of quantity of information. The entropy of a message depends on its probability; the less likely the message, the larger the entropy, because more information is necessary to describe the message completely. When transmitting information digitally, the entropy of a message is the fewest number of bits needed to transmit the message optimally. Entropy encoding schemes attempt to optimally encode messages by encoding more probable messages with short bit-length codes and less probable messages with longer codes.

Markov Model

A particular kind of system model used in probabilistic analysis. A Markov model describes a system by demonstrating various states that the system may be in and a set of probabilities for each of these transitions. Once created, a Markov model can be used to predict probabilities for various states of a system. Markov models can be created statically before use, or can be changed dynamically.

Run-Length Encoding (RLE)

An encoding method wherein a string of one repeating number is represented by a pair consisting of the number and the number of times that it repeats.

Quantization

Representing all values in a certain range with a single integer before encoding. While this allows for data to be stored more compactly, it naturally involves the loss of some information.

II. Overview of the Invention

The present invention provides a system and methods for encoding of matrices of discrete cosine transform coefficients. In one embodiment, multiple coefficients are advantageously represented together before entropy encoding to exploit dependencies between them. The representation of coefficients with dependencies allows more probable combinations of coefficient values to be represented in one unit, with means these more probable units can be given shorter codes. In one embodiment, Markov models are created to advantageously describe dependencies between coefficients and determine probabilities. Markov models allow dependencies to be easily identified and probabilities to be quickly calculated. In addition, Markov models can be modified during the course of encoding and transmission to take advantage of changes in the source data.

In one embodiment, descriptors are created that recursively describe groups of adjacent coefficients. These descriptors may represent Markov models of the coefficients. Descriptors that consistently group near-by coefficients are a useful method of exploiting near-by coefficients' tendencies to have similar values. In addition, by describing groups of coefficients when possible, and by recursively describing individual coefficients when necessary, the descriptors allow many coefficients to be described (and encoded) at once reducing the amount of information transmitted. Finally, the consistent form of the descriptors necessitates a reduced amount of processing power both at the encoding and decoding stages. Advantageously, in one embodiment, coefficients are represented in descriptors through the use of a relatively small set of identifiers. This allows the set of descriptors to be relatively small compared to the set of possible matrices, making probability computation and encoding scheme creation relatively easy. This also allows the absolute values of the most common coefficients to be represented by unique identifiers, greatly reducing the instances where coefficients have to be explicitly encoded.

III. System Description

FIG. 1 illustrates one embodiment of a system 100 in which the video encoding application 104 executes on a computer 106. The video encoding application 104 sends the output 114 to a storage device 108, which could be a video server, a hard disk drive, CD rewriteable drive, a read/write DVD drive, or any other device capable of storing and allowing the retrieval of encoded video data. The operation of the video encoding application 104 will be discussed in greater detail later. The storage device 108 is connected to another computer 110 or terminal via a direct connection (e.g., serial, parallel, etc.) or via a network connection such as a LAN, WAN, Internet, or the like. A video decoding application 112, executing on the computer 110, can then read the output 114 and decode the encoded video. As the decoder application 112 decodes the encoded video, it generates a reproduction of the video input sequence 102 on a display of the computer 110. In an alternative embodiment, the storage device 108 employs removable media. In this case the medium, (e.g. CD or DVD) can be replaced and distributed.

Figure 2:
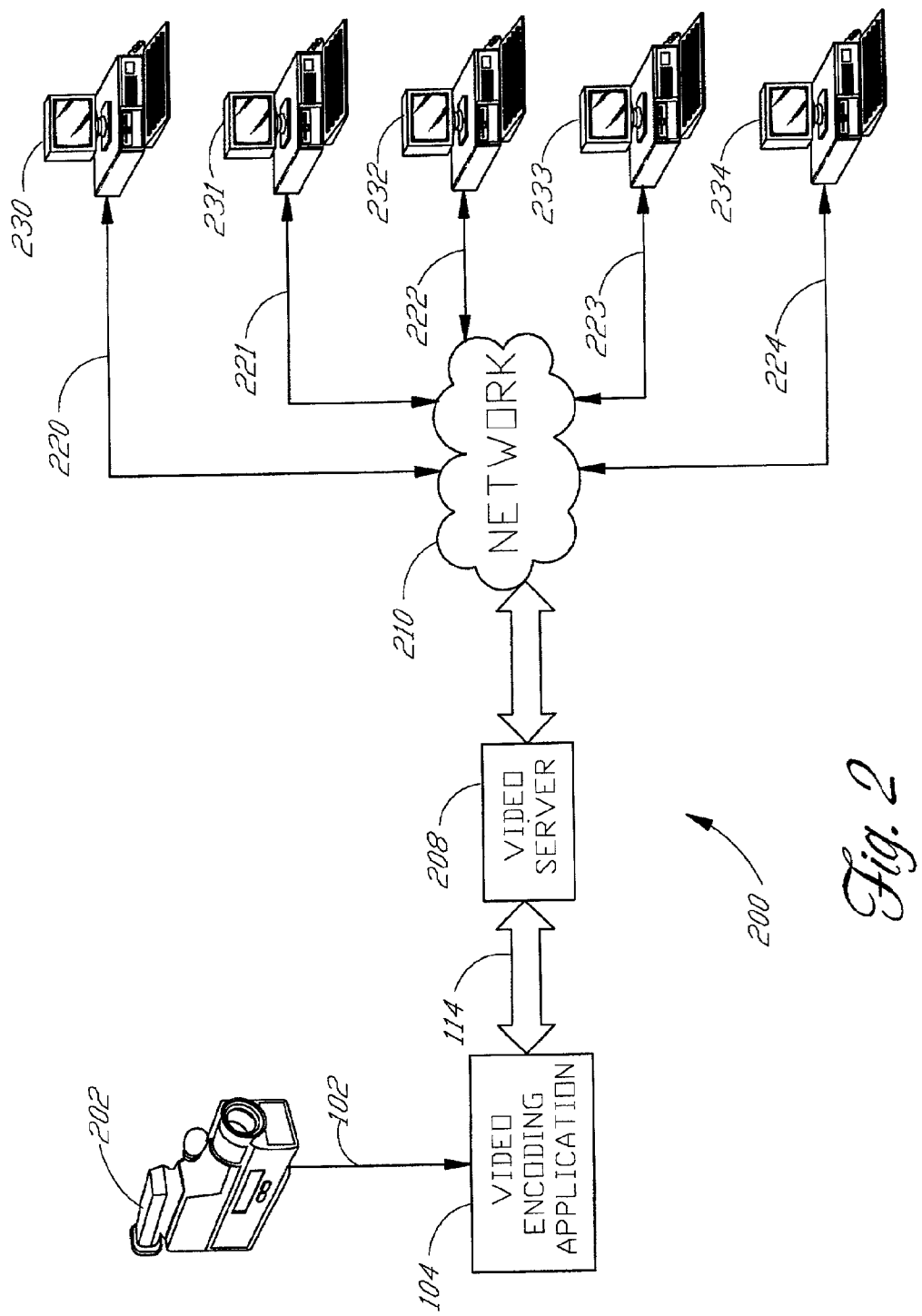
FIG. 2 illustrates another embodiment of a system including a video encoder application in accordance with the present invention.

FIG. 2 illustrates another system 200 in accordance with the present invention. A video capture device 202 such as a video camera supplies a video input sequence 102. The sequence 102 is directed as input to the video encoding application 104, which encodes the input sequence 102. The application 104 generates an output 114 which is then transferred to a video server 208 for subsequent processing. Upon demand by client computers 230–234, the server 208 processes the output 114 to extract and stream the encoded video streams 220–224 over a network 210, such as the Internet, an intranet, or the like. In addition, other terminals, such as networked televisions, personal digital assistants and telephones may also be used to receive the encoded streaming video.

In one embodiment, the application 104 can output encoded video in real time in a "live" mode. The application 104, in this case, can execute directly on the video server 208. Alternatively, the application 104 can execute on one computer with the output 114 being streamed to the video server 208 through a computer network. As the application 104 produces the output 114, the server 208 streams encoded video 320–324 to each client computer simultaneously in real-time.

FIG. 3 illustrates the video encoding application 104 in accordance with one embodiment of the present invention, wherein process states 302–316 use exemplary conventional techniques. The embodiment captures or receives a video frame 302 and processes it for later playback using a video processor 304 that produces a frame 306 of processed video pixels. In one embodiment, this video processing is done in compliance with the MPEG standard, using intra, predicted and bi-directional frames with motion prediction, though, it will be appreciated by one of standard skill in the art that the processing can be done in any number of standard ways, or not at all. The frame 306 is then divided into a series of 4×4 pixel blocks 308 to be encoded as separate entities. It will be appreciated by those of ordinary skill in the art that in an alternate embodiment the block size could be larger or smaller, or the blocks could be a different shape, without affecting the functioning of the present invention.

After the blocks 308 are identified, they are transformed using DCT module 310, creating 4×4 matrices of transform coefficients 312 which correspond to the original video data blocks 308. After transformation, the quantization module 314 processes the transform matrices 312, creating 4×4 matrices of quantized coefficients 316. These matrices are then passed to a novel coefficient encoder 318, which creates encoded representations 320 that can be transmitted across a network or stored for later decoding. The coefficient encoder is described in greater detail below.

Figure 4C:
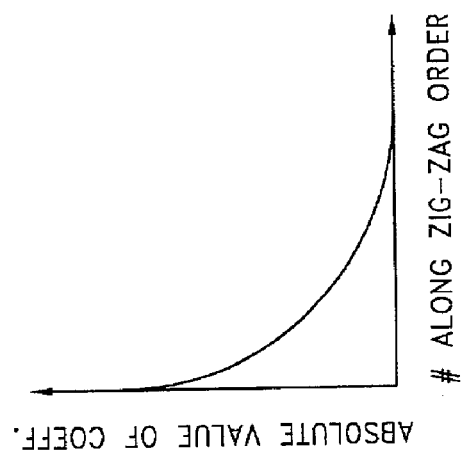
FIGS. 4b–c illustrate one conventional technique in encoding transformed video data.
Figure 4B:
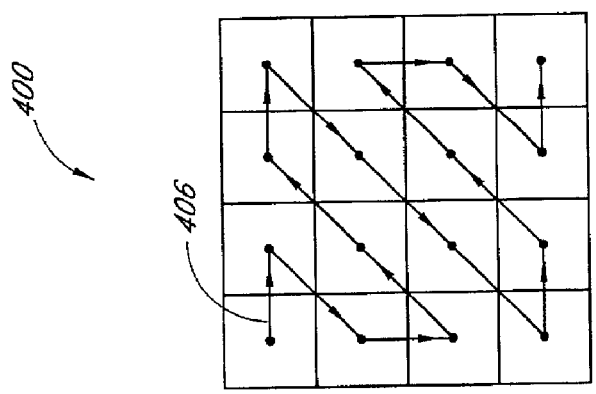
Figure 4A:
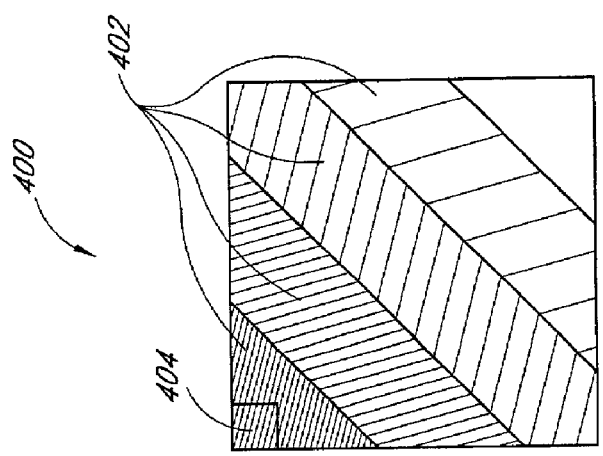
FIG. 4a illustrates a property of transformed video data.

FIG. 4a demonstrates a property of transformed quantized video data. When video is transformed into a matrix of coefficients, there is a tendency for coefficients that have adjacent locations along certain bands to have roughly similar absolute values. This is illustrated in FIG. 4a, where a representation of a coefficient matrix 400 is shown. The differently shaded bands 402 on matrix 400 roughly demonstrate the tendency of values to get closer to zero as they get "further" from upper right corner 404. FIG. 4b demonstrates a conventional method of exploiting this property, wherein the coefficient comprising a matrix 400 were visited along a "zig-zag" path 406 in order to group similarly distributed values together. This method typically involves encoding coefficients using a form of RLE such that for each non-zero coefficient visited, the encoder encodes a pair consisting of the coefficient and the number of zeros that follow it along the zig-zag path. FIG. 4c illustrates the tendency of absolute values of coefficients toward zero the further along the path they lie. As FIG. 4c suggests, the zig-zag encoding scheme allows for somewhat more efficient encoding, as many of the zeros in the matrix will fall together along the path.

After the coefficients are grouped according to the zig-zag path and parsed into RLE pairs, they are then typically encoded according to an entropy encoding scheme, such as Huffman coding, Shannon-Fano coding, or arithmetic coding. FIG. 4d illustrates an one example of an entropy encoding, here a Huffman encoding scheme over a set of eight descriptors with varying probabilities. The structure and use of the descriptors will be described in greater detail later. In FIG. 4d, each descriptor is represented by a letter for simplicity. As suggested by FIG. 4d, these schemes utilize the probabilities of each symbol to create a more efficient coding that gives shorter encoded representations to more frequent symbols. For example, under the Huffman coding table given in FIG. 4d, the most probable symbol, "a" only takes one bit to transmit, while a much less probable symbol, "f" takes six bits. The creation of this code can be done either by creating a static coding table before actual encoding of data, or it can be created dynamically during encoding, through the use of methods such as adaptive Huffman coding. In the former case, encoding and decoding are easier, but the scheme, if based on probabilities from another data source, may not make for the most efficient coding. In the latter case, the encoding scheme changes as more symbols are encoded and their probabilities are known with greater accuracy, frequently creating more efficient code, but greater processing power is required.

In the conventional method illustrated in FIGS. 4b–c, an entropy encoding is utilized at the final stage to encode the RLE pairs. The zig-zag method is somewhat lacking, however, in that it ignores the fact that there may be dependencies and correlations between non-zero coefficients. It is also limited in that it fails to consider any combinations of coefficients other than those that lie next to each other along the path.

Rather than merely analyzing dependencies between coefficients at adjacent matrix locations the present invention takes advantage of dependencies between both adjacent and non-adjacent coefficient locations, and also between groups of coefficients, allowing for more efficient entropy encoding. The invention allows for a substantial reduction in the size of the data files that are transmitted; in some cases these savings are as high as 22 percent of the a duplicate file encoded under typical methods.

One embodiment of the present invention uses descriptors that group together coefficients. The descriptor for a matrix describes not only individual coefficients, but can also describe entire groups of coefficients in a shorthand form. These groups are then described in greater detail through the use of smaller descriptors. In one embodiment the descriptors only explicitly describe coefficients when necessary, using descriptions of groups when possible reducing the bandwidth and storage area needed to transmit and/or store the encoded video. By grouping the coefficients, dependencies exhibit themselves in the probabilistic analysis of the descriptors. This analysis may be performed through the use of a number of probabilistic or statistical methods, including Markov modeling, which will later be described in greater detail. It is these descriptors which are then encoded using entropy encoding and then transmitted over a network.

In one embodiment, the encoding process is performed through the use of separate code tables created for 4×4 master descriptors, for 2×2 master descriptors, and for individual coefficients. Alternate embodiments may use combined code tables. In one embodiment, the code table is created prior to the video encoding process through the analysis of a large set of video data similar to that which will be encoded. This sample video data is processed using the same process described in FIG. 3, from which are generated descriptors using the methods described below. The statistics of this descriptor set are analyzed and an entropy code is created as described above. This code can later be used for data that is to be transmitted, and because of the similarity in the two video data sources, the entropy code should be an efficient one for the transmitted data. An alternate embodiment comprises a code table created adaptively during the encoding, which would not require the prior creation of a code table.

The following example illustrates the use of one embodiment of the present invention to encode coefficients. FIGS. 5a–b show the video DCT coefficient locations described by two descriptors 500 and 502. These descriptors are used to encode a 4×4 block of coefficients. A full 4×4 matrix of coefficient locations can be grouped by descriptor 500. The descriptor describes each coefficient location (0,0), (0,1), (1,0) and (1,1) in the top left quadrant TL individually, as they are more likely to be non-zero. The other three quadrants TR (top right), BL (bottom left) and BR (bottom right) are described in the descriptor without dividing them into individual coefficients. The coefficients in the three quadrants TR, BL and BR are then inspected and if any contains non-zero coefficients, the contents of that quadrant are described further using 2×2 descriptor 502. An alternate embodiment may group different adjacent coefficient locations for analysis, and/or consider non-adjacent coefficient locations.

FIG. 6 illustrates one embodiment of a technique through which video DCT coefficients can be identified in the descriptors. In this embodiment, coefficients are mapped to identifiers according to their absolute values; it is these identifiers which are used to represent coefficient values within the descriptors. The mapping is performed to allow descriptors to be defined using a fixed set of known values, which creates a smaller set of possible descriptors. For example, table 600 shows the values that are mapped in one embodiment for coefficient location (0,0) in both 4×4 and 2×2 descriptors. In this embodiment, if the coefficient is −2, −1, 0, 1 or 2, the coefficient has a unique identifier. Since this identifier included as part of the master descriptor, which is described below, the absolute value of the coefficient will be encoded in the master descriptor. Thus, only the sign of the coefficient will need to be transmitted later in the descriptor. For example, if the coefficient −2 is being included in a descriptor, it is mapped to identifier 2, which is then included the in master descriptor section of the descriptor. Later in the descriptor this is followed by an indicator to show that the value of the coefficient is negative.

If the absolute value of a coefficient in a descriptor is greater than 2, it is not uniquely identified, as all values in this range are have the identifier 3. Therefore, the master descriptor section of the descriptor will only contain enough information to note that the coefficient's absolute value is greater than 2. Thus, the precise value of the coefficient will be included later in the descriptor. The descriptor format is discussed in more detail discussed below.

In the embodiment example illustrated in FIG. 6, tables 600 and 602 illustrate that coefficient location (0,0) has more associated possible identifiers than locations (0,1), (1,0) and (1,1). The example mapping was implemented in this manner because location (0,0) is more likely to have a higher absolute value, and therefore needs more possible identifiers for an accurate encoding. It will be appreciated that in alternative environments, an alternate mapping of coefficient values to identifiers would suffice, though it may or may not be as efficient. Table 604 shows the identifiers used when identifying quadrants TR, BL and BR. Table 604 assigns an identifier to the quadrant based on whether or not the coefficients within it are all zero. If the quadrant contains a non-zero number, the quadrant is mapped to the identifier 1 and is later included in the descriptor as a 2×2 descriptor. If each coefficient located in the quadrant is 0, then the identifier alone conveys that information and the coefficients in the quadrant do not need to be separately included. It will also be appreciated that these 2×2 coefficient blocks could have a number of different mappings.

One embodiment of the invention involves creating a Markov model of coefficients from which probabilistic data may be derived. The structure of the Markov model will be discussed later. The descriptors may be used as representations of Markov models of adjacent coefficients. In one embodiment, the states of the models are defined as each combination of 1) a coefficient location or group of coefficients and 2) a possible identifier for that location or group. The probabilities of transitions in the models represented in a descriptor are combined to form the probability of the whole descriptor. In essence, since one particular descriptor represents one specific combination of values for the coefficients or blocks it describes, it also represents one specific combination of states in a Markov model that represents those coefficients and groups. It will be appreciated that alternate embodiments may include different organization of coefficients and blocks or may involve different representation of Markov states.

Figure 5C:
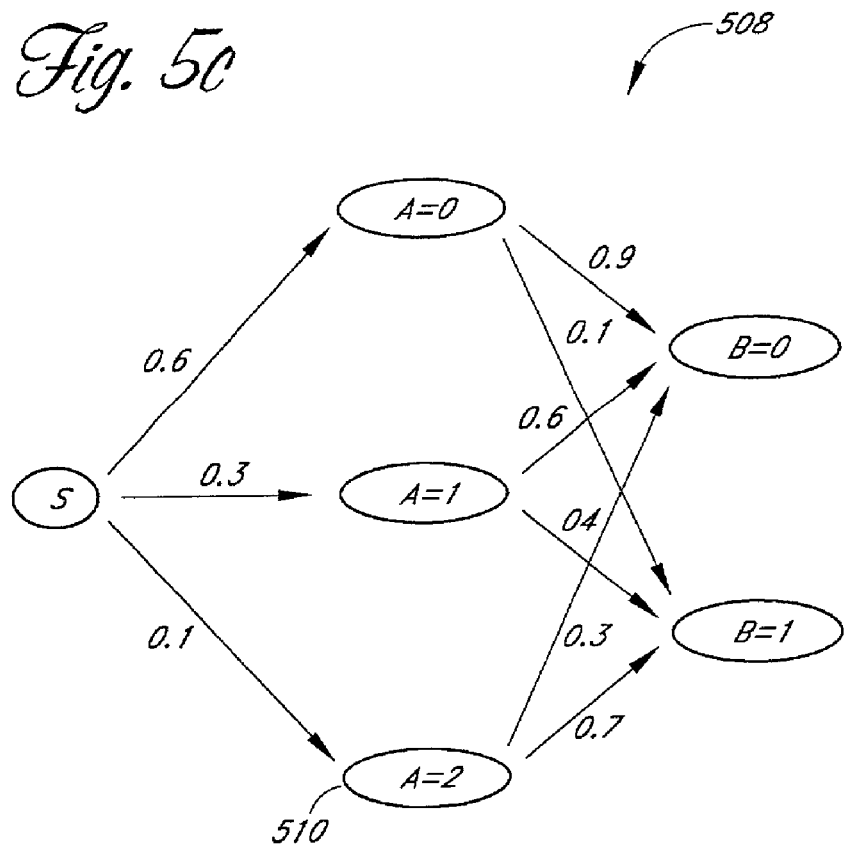
FIGS. 5c–d illustrate an example of a Markov model for matrix coefficient values.
Figure 5D:
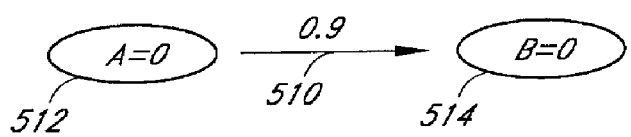

FIG. 5c illustrates a small Markov model 508 for two DCT matrix coefficient locations, referred to as A and B. In this example, location A may be represented by identifiers 0, 1 and 2, and location B may be represented by identifiers having values 0 and 1. FIG. 5d illustrates one particular transition 510 for the purposes of clarity. In FIG. 5d, state 512 represents a state of a matrix where A maps to the identifier 0 and state 514 represents a state of a matrix where B maps to the value 0. The transition 510 represents a relationship where, when coefficient A maps to 0, there is a 0.9 probability that coefficient B maps to 0. FIG. 5d illustrates a relationship between the two coefficients that demonstrates B's dependency on or correlation with the value of A. The model can be used by starting at the dummy S state, then following a transition to the state corresponding to the identifier for the coefficient at location A, and then following a transition from that state to the state corresponding to the identifier for the coefficient at location B.

For example, if A maps to 1, B has a 0.4 probability of mapping to 1, whereas if A maps to 2, B's probability of mapping to 1 is 0.7. Markov models can be used to find probabilities for certain combinations of values. By way of example, model 508 demonstrates that the probability of A mapping to 2 and B mapping to 1 is 0.1*0.7=0.07, where there is a 0.1 probability that the coefficient at A will map to 2 and a 0.7 probability that if A maps to 2, that B will map to 1. It will also be appreciated that Markov models can be represented as data structures using a number of methods known to those of ordinary skill in the art without affecting the functioning of the present invention. It will also be appreciated to those of ordinary skill that when representing coefficient matrices with Markov models the states of the models do not necessarily have to represent exact values of the coefficients or identifiers. For example, the states may represent ranges of values for particular coefficients or identifiers or may represent more than one coefficient location.

Figure 7A:
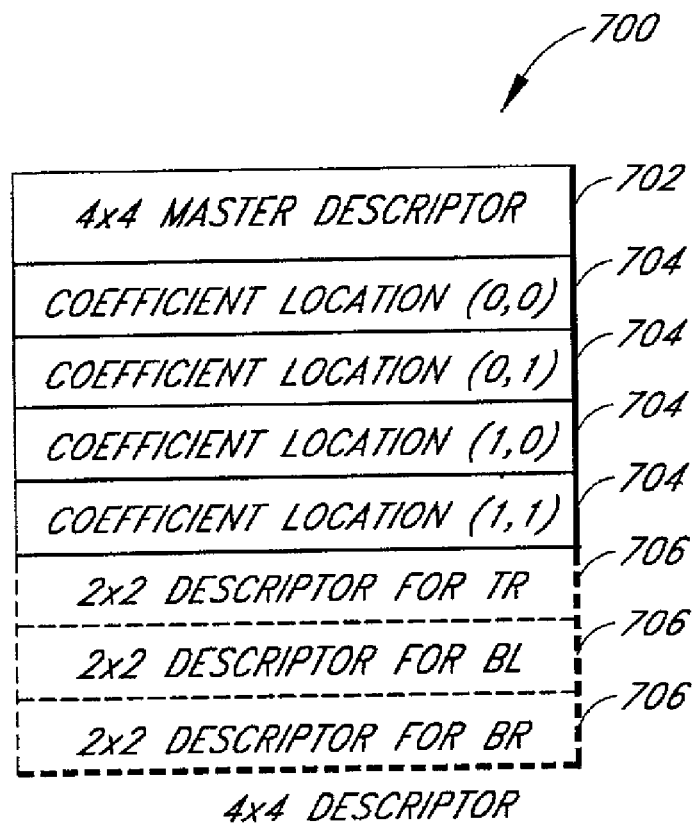
FIGS. 7a–d illustrate the contents of typical 4×4 and 2×2 descriptors.

FIGS. 7a–d illustrate one embodiment of the data structures of 4×4 and 2×2 descriptors before they are mapped to the entropy encoding tables. FIG. 7a illustrates one embodiment of a 4×4 descriptor 700. Descriptor 700 includes a master descriptor 702 which contains shorthand information about the entire descriptor, including identifiers for coefficient locations (0,0), (0,1), (1,0) and (1,1) of the 4×4 matrix. Descriptor 700 also includes additional coefficient information 704 for coefficient locations (0,0), (0,1), (1,0) and (1,1). In this embodiment, the amount of information included in the coefficient information is variable. If the coefficient has a unique identifier, its absolute value is contained within the master descriptor 702 and therefore only the sign of the coefficient is needed in the coefficient information 704. If the coefficient is not uniquely identified in the master descriptor 702 however, the coefficient itself is then explicitly included in the coefficient information 704. It will be appreciated that this technique reduces the data-size, however alternative embodiments may encode every coefficient explicitly. In this embodiment, descriptor 700 also contains 2×2 descriptors 706, when needed. If any of the quadrants TR, BL or RB are encoded in the master descriptor 702 as all-zero, then it is unnecessary to encode that quadrant further and no 2×2 descriptor is included for that quadrant in descriptor 700. Otherwise, the quadrant is included as a 2×2 descriptor. It will also be appreciated that alternate embodiments of the present invention may explicitly encode every 2×2 descriptor within each 4×4 descriptor.

Figure 7B:
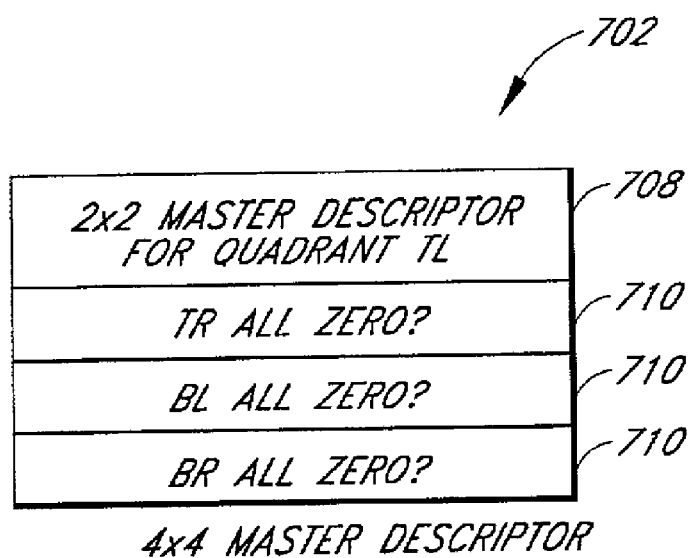

FIG. 7b illustrates one embodiment of the 4×4 master descriptor 702. Master descriptor 702 includes a 2×2 master descriptor 708 that describes the coefficient locations (0,0), (0,1), (1,0) and (1,1) of TL considered together as a quadrant. The 4×4 master descriptor 702 also contains flags 710 that indicate whether or not quadrants TR, BL and BR contain all zeros. In one embodiment, the 2×2 master descriptor 708 is represented by a single byte of data and the flags 710 are represented by single bits to reduce data size, thus, storage and bandwidth requirements. It will be appreciated that alternate embodiments may use different representations.

Figure 7C:
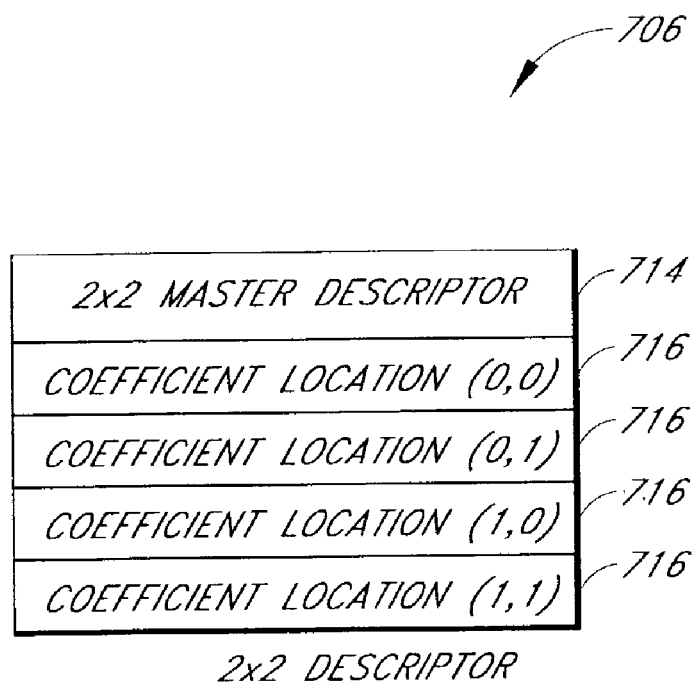

FIG. 7c illustrates one embodiment of a 2×2 descriptor 706, used to represent quadrant TR, BL or BR. Descriptor 706 includes a 2×2 master descriptor 714 with identifier information for coefficient locations (0,0), (0,1), (1,0) and (1,1) of the that 2×2 quadrant. Descriptor 706 also includes coefficient information 716 for coefficient locations (0,0), (0,1), (1,0) and (1,1). In this embodiment, the amount of information included in the coefficient information is variable. If the coefficient has a unique identifier, its absolute value is contained within the 2×2 master descriptor 714 and therefore only the sign of the coefficient is needed in the coefficient information 716. If the coefficient is not uniquely identified in the 2×2 master descriptor 714 however, the coefficient itself is then explicitly included in the coefficient information 716. It will be appreciated that this technique reduces the data-size, however alternative embodiments may encode every coefficient explicitly.

Figure 7D:
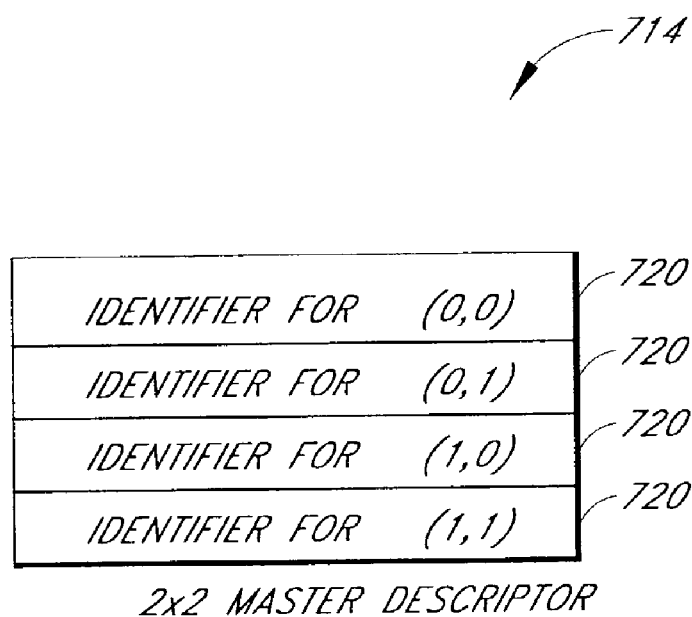

FIG. 7d illustrates one embodiment of a 2×2 master descriptor 714. Master descriptor 714 contains identifiers 720 for coefficient locations (0,0), (0,1), (1,0) and (1,1). In one embodiment, master descriptor 718 is represented by one byte, each identifier 720 being represented by two bits; this is done in an effort to reduce data size. It will be appreciated that alternate embodiments may use different representations.

Figure 8B:
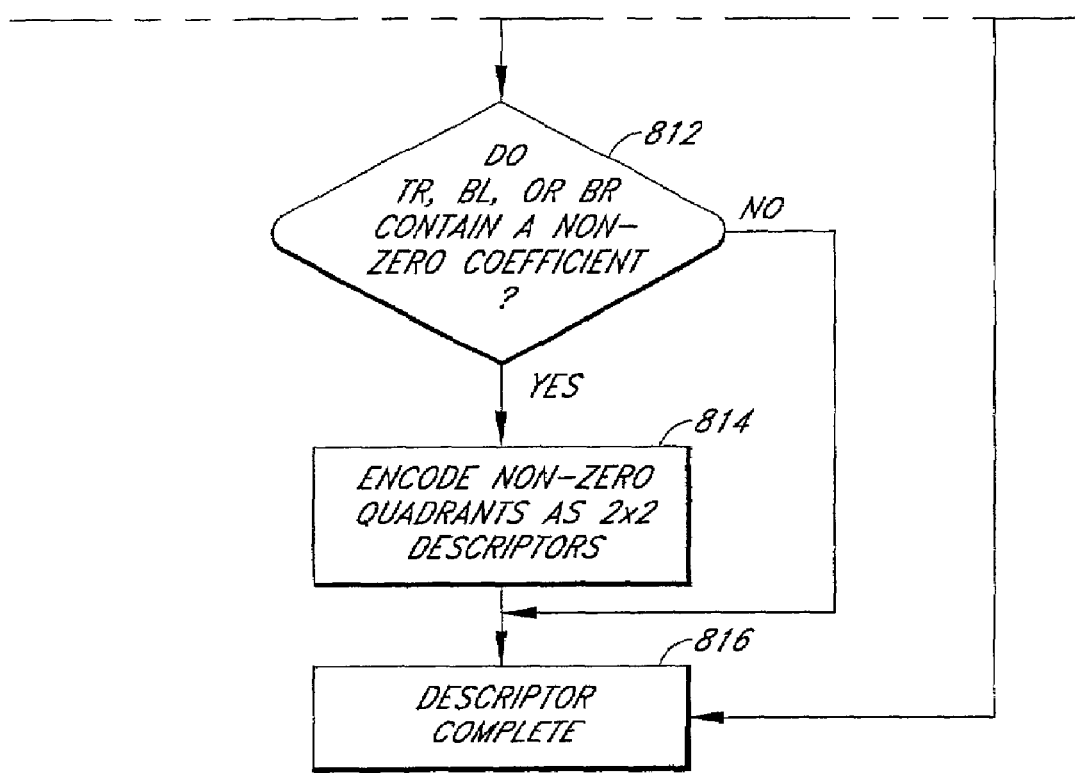

FIGS. 8a–b illustrate a flowchart of an example process performed by one embodiment of the present invention to create and encode a 4×4 descriptor. At state 800, the coefficient encoder inputs a 4×4 matrix of DCT coefficients, representing a processed video frame. At state 802, the encoder creates a 4×4 master descriptor. As shown in FIGS. 7b and 7d, this master descriptor contains the four identifiers for coefficient locations (0,0), (0,1), (1,0) and (1,1) in the 4×4 block, and three flags denoting whether quadrants TR, BL and BR of the 4×4 block contain all zeros. After this master descriptor is created at state 802, the master descriptor is encoded.

Figure 9:
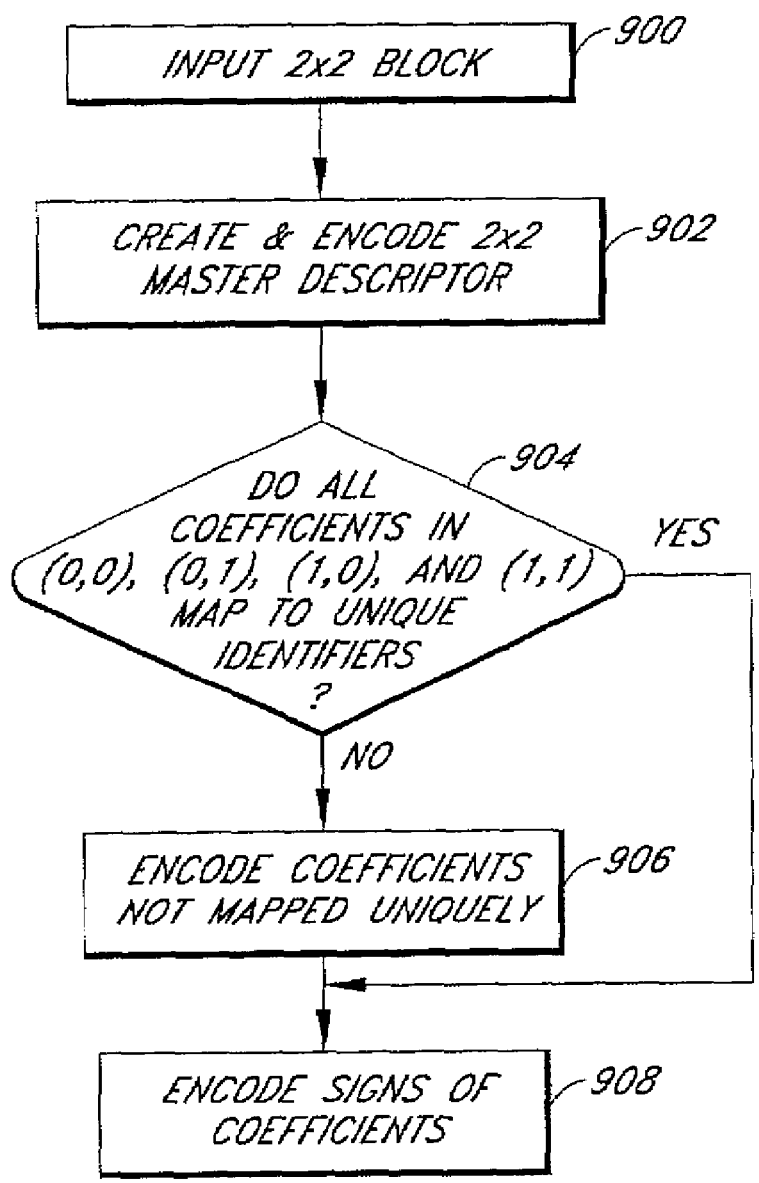

In one embodiment, throughout the process illustrated in FIGS. 8a–b and FIG. 9, encoding of master descriptors, coefficients, and descriptors is accomplished using Huffman coding. Alternative embodiments may use other entropy encoding schemes, including Shannon-Fano coding or arithmetic coding. In this embodiment, separate Huffman code tables are created for 4×4 master descriptors, for 2×2 master descriptors and for individual coefficients. This is done to produce an efficient coding. Alternative embodiments may use combined Huffman tables, but this may result in less efficient coding. The tables, the descriptors and coefficients are used to code strings of bits, which are then placed in a bit stream for transmission or storage, as will be appreciate by those of ordinary skill in the art. Also, in one embodiment, encoded data may be transmitted as soon as it is encoded, while another embodiment, encoded data may be collected into one larger file for immediate or delayed transmission, or for storage. Alternative embodiments may utilize fixed or adaptive Huffman codings.

At state 804, after the 4×4 master descriptor is encoded, the encoder determines if the 4×4 matrix contains only zero coefficients. In one embodiment, the determination is performed by reading the 4×4 master descriptor, which will be zero if there are only zero coefficients in the 4×4 block. In alternate embodiments, this process may be performed by a different analysis of the 4×4 master descriptor or by an analysis of the 4×4 coefficient block itself.

If there are only zero coefficients in the 4×4 block, then there is no need for creation or encoding and the encoder may skip to state 816, signifying completion. If there are non-zero coefficients in the block, then control passes to state 806. At state 806, the encoder checks to see if the coefficients in locations (0,0), (0,1), (1,0) and (1,1) were mapped to unique identifiers. For example, in the embodiment illustrated in FIG. 6, if the coefficient at (0,0) were −2 and coefficients at (0,1), (1,0) and (1,1) were −1, 0 and 1, then state 806 would answer "yes." If, on the other hand, the absolute value of the coefficient at (0,0) were greater than 2 or the absolute value of one of the other coefficients were greater than 1, the answer would be "no" because one of the coefficients would be mapped to an identifier that would not uniquely identify its value.

If, at state 806, the encoder determines that each coefficient is mapped to a unique identifier, then control passes to state 810. If not, then control passes to state 808, where the values of the non-uniquely mapped individual coefficients are encoded. In one embodiment, especially large coefficients may be represented through their base 2 logarithms along with extra bits to denote the exact value of the coefficient. This allows the entropy encoding table for the coefficients to stay relatively small. Control then passes to state 810, where the signs of the coefficients at locations (0,0), (0,1), (1,0) and (1,1) are encoded. In an alternate embodiment, the value (if needed) and signs of each coefficient may be encoded together, rather than all the values followed by all of the signs. In alternate embodiments, ordering may be switched or all coefficients may be encoded, regardless of value. It will be appreciated that these methods are essentially the same, though some may result in undesirable extra data size.

After necessary coefficients and the signs are encoded in states 808 and 810, control passes to state 812. At state 812, the encoder inspects the blocks to determine if any of quadrants TR, BL or BR contains non-zero coefficients. Much like the consideration of the entire 4×4 matrix in state 804, as will be understood to those of ordinary skill in the art, this analysis can be done in numerous equivalent ways, including analyzing the 4×4 master descriptor or analyzing the coefficients in the original 4×4 block. If all three quadrants TR, BL and BR contain only zero coefficients, then control passed to state 816, signifying completion. If there are non-zero coefficients in the blocks, though, control passes to state 814, where each quadrant containing a non-zero coefficient is encoded as a 2×2 descriptor. This process of creating a 2×2 descriptor is described in FIG. 9. After the needed sub-blocks have been encoded as 2×2 descriptors, control passes to state 816, signifying completion.

FIG. 9 is a flowchart illustrating an example process performed in accordance with one embodiment of the present invention to create and encode a 2×2 descriptor. At state 900, the coefficient encoder inputs a 2×2 block of DCT coefficients. At state 902, the encoder creates a 2×2 master descriptor. As shown in FIGS. 7b and 7d, this master descriptor contains only the four identifiers for coefficient locations (0,0), (0,1), (1,0) and (1,1) of the quadrant being described. Thus, it will be appreciated that the details of creating a master descriptor in this state will be understood to those of ordinary skill in the art. After this master descriptor is created in 902, it is encoded. At state 904, the encoder checks to see if the coefficient at (0,0), (0,1), (1,0) and (1,1) were mapped to identifiers that only map to one absolute coefficient value.

If at state 904 the encoder finds that each coefficient is mapped to a unique identifier, then control passes to state 908. If not, then control passes to state 906, where the values of the non-uniquely mapped individual coefficients are encoded. This encoding performed as described above. Control then passes to state 908, where the signs of coefficients at locations (0,0), (0,1), (1,0) and (1,1) are encoded. This is performed in the same manner as performed in states 806, 808, and 810 in FIG. 8a, and can be implemented in the same alternate ways.

It will be appreciated that the encoded files may be decoded through a process similar to that of the encoding process. For example, a matrix of DCT coefficients may be created that may be analyzed to reconstruct the original video image. Both the encoding and decoding machine may utilize the same entropy encoding tables, either by holding the same static table on both ends, or by similarly modifying their tables through methods such as adaptive Huffman coding. Thus, the entropy encoded descriptors and coefficients may be decoded with the same tables to their original forms. Through an analysis of the initial master descriptor file of each descriptor, the receiving computer or terminal can determine the format of the rest of the descriptor, and recreate the original matrix of coefficient accordingly. This method involves essentially the reverse analyses as that of FIGS. 8a, 8b, and 9.

Thus, in accordance with the embodiments described above, the present invention provides a system for improved video compression. Through the use of probabilistic techniques, specifically Markov modeling, the present invention provides superior video compression to typical systems and allows for greater flexibility in compression technique. While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. It is intended that the scope of the invention be limited not by this detailed description but by the claims appended hereto.

What is claimed is:

1. A method of encoding transformed quantized video data for transmission over a network, comprising:
   receiving a matrix of transform coefficients;
   isolating specific coefficient locations and groups of coefficients to be represented in a descriptor;
   mapping values of coefficients in said specific locations and said groups to defined identifiers;
   combining said identifiers to create a first descriptor for the matrix;
   including information in said first descriptor to explicitly identify the values at said specific coefficient locations;
   creating descriptors smaller then the first descriptor that contain the explicit values of coefficients in said groups of coefficients;
   creating entropy encoding schemes for said descriptors and said values of coefficients; and
   encoding said descriptors and values of coefficients according to said encoding schemes.

2. The method of claim 1, wherein said matrix is a matrix of discrete cosine transform coefficients.

3. The method of claim 2, wherein said matrix is a 4×4 matrix.

4. The method of claim 1, wherein said specific coefficient locations are from a top left quadrant of said matrix.

5. The method of claim 4, wherein said groups comprise 2×2 coefficient quadrants correspondingly located in top right, bottom left and bottom right portions of the 4×4 matrix.

6. The method of claim 1, wherein said coefficient locations and groups of coefficients are mapped to identifiers according to the coefficients' absolute values, and said information includes the signs of the coefficients.

7. The method of claim 1, wherein at least a first of said encoding schemes utilizes a static entropy code table created before said encoding by analyzing descriptors created from samples of video data and creating said code table from an analysis of the probabilities of said sample descriptors.

8. The method of claim 7, wherein said static entropy code is a static Huffman code.

9. The method of claim 1, wherein at least a first of said encoding schemes utilizes an adaptive entropy code that is modified over the course of the encoding process according to the properties of the currently encoded video source.

10. The method of claim 9, wherein said adaptive entropy code is an adaptive Huffman code.

11. A computer readable storage medium comprising computer program code stored thereon for causing an electronic device to process the computer-program code by performing the method of claim 1 when such program is executed on the electronic device.

12. A method of encoding a matrix of transform coefficients of video data comprising:
receiving said matrix of transform coefficients;
creating a probabilistic model representing dependencies and correlations between coefficient locations and groups of coefficients from said matrix; and
utilizing the probabilistic model to create an entropy encoding of the matrix,
wherein said probabilistic model is represented by descriptors that correspond to coefficient locations and groups of coefficients and wherein said descriptors contain internal descriptors that describe the explicit coefficients within groups represented by relatively larger descriptors.

13. The method of claim 12, wherein said matrix is a matrix of discrete cosine transform coefficients.

14. The method of claim 13, wherein said matrix is a 4×4 matrix.

15. A computer readable storage medium comprising computer program code stored thereon for causing an electronic device to process the computer-program code by performing the method of claim 12 when such program is executed on the electronic device.

16. A method of encoding transformed quantized video data for transmission over a network, comprising:
receiving a matrix of transform coefficients;
isolating one or more coefficients in specific locations and groups of coefficients to be represented in a descriptor;
mapping values of the one or more coefficients in said specific locations and said groups to defined identifiers;
combining said identifiers to create a descriptor for the matrix;
including information in said descriptor to explicitly identify the values of the coefficients at said specific locations;
creating a first encoding scheme that describes the explicit values of the coefficients in said groups;
creating entropy encoding schemes for said descriptor and said values of the coefficients; and
encoding said descriptor and said values of the coefficients according to said first and entropy encoding schemes.

17. The method of claim 16, wherein said matrix is a matrix of discrete cosine transform coefficients.

18. The method of claim 17, where said matrix is a 4×4 matrix.

19. The method of claim 16, wherein said specific coefficient locations are from a top left quadrant of said matrix.

20. The method of claim 19, wherein said groups comprise 2×2 coefficient quadrants correspondingly located in top right, bottom left and bottom right portions of the 4×4 matrix.

21. The method of claim 16, wherein said coefficient locations and groups of coefficients are mapped to identifiers according to the coefficients' absolute values, and said information includes the signs of the coefficients.

22. The method of claim 16, wherein at least a first of said encoding schemes utilizes a static entropy code table created before said encoding by analyzing descriptors created from samples of video data and creating said code table from an analysis of the probabilities of said sample descriptors.

23. The method of claim 22, wherein said static entropy code is a static Huffman code.

24. The method of claim 16, wherein at least a first of said encoding schemes utilizes an adaptive entropy code that is modified over the course of the encoding process according to the properties of the currently encoded video source.

25. The method of claim 24, wherein said adaptive entropy code is an adaptive Huffman code.

26. A computer readable storage medium comprising computer program code stored thereon for causing an electronic device to process the computer-program code by perforating the method of claim 16 when such program is executed on the electronic device.

* * * * *